(12) United States Patent
Bueb et al.

(10) Patent No.: US 8,843,731 B2
(45) Date of Patent: Sep. 23, 2014

(54) MEMORY DEVICE USING EXTENDED INTERFACE COMMANDS

(75) Inventors: Christopher Bueb, Folsom, CA (US); Poorna Kale, Folsom, CA (US); Todd Legler, Shingle Springs, CA (US)

(73) Assignee: Micron Technology, Inc., Boise, ID (US)

( * ) Notice: Subject to any disclaimer, the term of this patent is extended or adjusted under 35 U.S.C. 154(b) by 937 days.

(21) Appl. No.: 12/982,847

(22) Filed: Dec. 30, 2010

(65) Prior Publication Data
US 2012/0173793 A1  Jul. 5, 2012

(51) Int. Cl.
*G06F 9/38* (2006.01)
*G06F 9/30* (2006.01)

(52) U.S. Cl.
CPC ............... *G06F 9/3004* (2013.01); *G06F 9/38* (2013.01); *G06F 9/30185* (2013.01)
USPC .......................................................... 712/225

(58) Field of Classification Search
CPC .......................................................... G06F 9/38
See application file for complete search history.

(56) References Cited

U.S. PATENT DOCUMENTS

| | | | | |
|---|---|---|---|---|
| 5,509,134 | A | * | 4/1996 | Fandrich et al. ............... 711/103 |
| 5,822,251 | A | * | 10/1998 | Bruce et al. ............... 365/185.33 |
| 6,385,691 | B2 | * | 5/2002 | Mullarkey et al. ............ 711/105 |
| 6,757,211 | B2 | * | 6/2004 | Zitlaw et al. ............. 365/230.06 |
| 7,480,788 | B2 | * | 1/2009 | Suzuki .......................... 712/225 |
| 7,574,611 | B2 | * | 8/2009 | Cohen ........................... 713/300 |
| 7,644,191 | B2 | * | 1/2010 | Nicolson et al. .................. 710/5 |
| 8,223,527 | B2 | * | 7/2012 | Lee et al. ....................... 365/148 |
| 2007/0260757 | A1 | * | 11/2007 | Bueb et al. ......................... 710/5 |
| 2008/0016269 | A1 | * | 1/2008 | Chow et al. .................... 711/103 |
| 2010/0235570 | A1 | * | 9/2010 | Tsai et al. ...................... 711/103 |

\* cited by examiner

*Primary Examiner* — Eric Coleman
(74) *Attorney, Agent, or Firm* — Dorsey & Whitney LLP

(57) ABSTRACT

A memory device includes a serial interface buffer that receives a hardware-decodable command and an extended interface command. The memory device also includes a logic module that directs the hardware-decodable command to a register for execution by a microcontroller. The logic module additionally loads a command received following the extended interface command into a sub-op-code register, wherein the logic module remains passive after loading the command received following the extended interface command into the sub-op-code register. Also included is a microcontroller that interprets the command in the sub-op-code register.

19 Claims, 6 Drawing Sheets

US 8,843,731 B2

MEMORY DEVICE USING EXTENDED INTERFACE COMMANDS

FIELD

The present invention relates generally to memory devices, and more specifically, to memory devices that operate using commands.

BACKGROUND

In many conventional memory devices, access to the memory is controlled internally by a microcontroller along with additional, hardware-based logic. The functions that can be performed by the microcontroller and the additional logic are determined relatively early in the design phase by way of mask plates used in the photolithography of the memory device. In many instances, the preparation of mask plates represents a significant investment in research and development resources. Thus, modifying a mask plate can bring about a considerable delay in the production of the memory device as well as incurring additional research and development costs.

BRIEF DESCRIPTION OF THE DRAWINGS

Embodiments of the invention are illustrated by way of example and not limitation in the figures of the accompanying drawings, in which.

DESCRIPTION OF EMBODIMENTS

Figure 1:
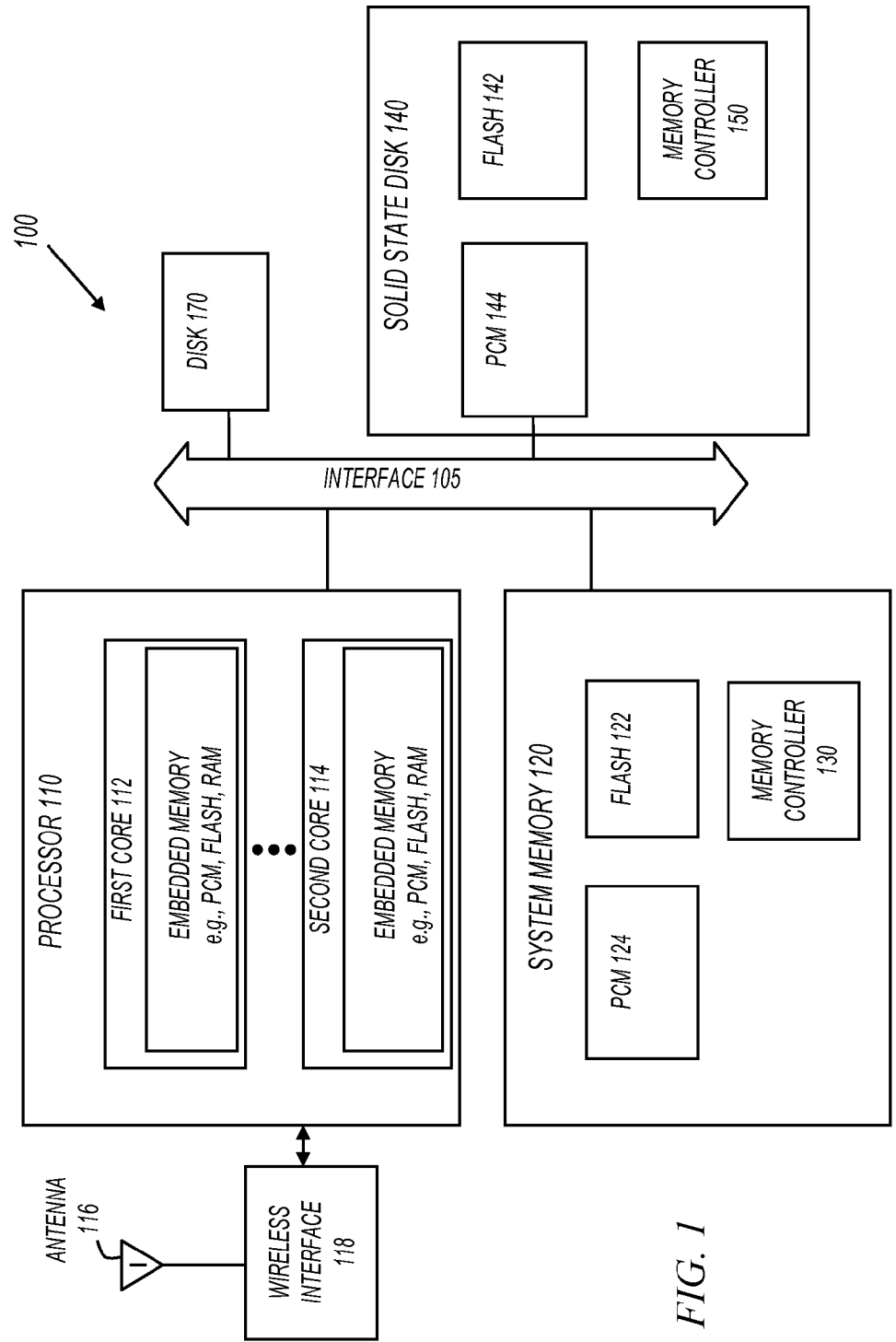
FIG. 1 shows an electronic system in accordance with various embodiments of the invention.

In the following detailed description, reference is made to the accompanying drawings and tables that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification, discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or the apparatus may comprise a general purpose computing device selectively activated or reconfigured by a computer program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), non-volatile memories such as electrically programmable read-only memories (EPROMs), electrically erasable and programmable read only memories (EEPROMs), or FLASH memories, or any other type of media suitable for storing electronic instructions, and capable of being coupled to a system bus for a computing device.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicate that two or more elements are in either direct or indirect (with other intervening elements between them) physical or electrical contact with each other, and/or that the two or more elements co-operate or interact with each other (e.g. as in a cause an effect relationship).

FIG. 1 shows a system 100 in accordance with various embodiments of the present invention. System 100 may be any type of device that includes memory without departing from the scope of the present invention. For example, system 100 may be a computer or a mobile phone with nonvolatile memory. In another example, system 100 may be a global positioning system (GPS) receiver or a portable media player having nonvolatile memory.

In the embodiment of FIG. 1, system 100 includes a wireless interface 118 coupled to antenna 116 to allow system 100 to communicate with other devices that also communicate over-the-air. As such, system 100 may operate as a cellular device or a device that operates in wireless networks such as, for example, Wireless Local Area Networks (WLANs), WiMax and Mobile WiMax based systems, Wideband Code Division Multiple Access (WCDMA), and Global System for Mobile Communications (GSM) networks, any of which may or may not operate in accordance with one or more standards. The various embodiments of the invention are not limited to operate in the above-identified network types; this is simply a list of examples. It should be understood that the scope of the present invention is not limited by the types of, the number of, or the frequency of the communication protocols that may be used by system 100. Embodiments are not, however, limited to wireless communication embodiments. Other non-wireless applications can make use of the various embodiments of the invention.

In some embodiments, wireless interface 118 may include one or more stand-alone Radio Frequency (RF) discrete or integrated analog circuits. In other embodiments, wireless interface 118 may be embedded within an integrated circuit that includes other components. For example, in some embodiments, wireless interface 118 may be included on a common integrated circuit with processor 110.

Processor 110 includes at least first core 112. In some embodiments, processor 110 includes additional cores such as second core 114, and each core may include memory. For example, first core 112 may include volatile or nonvolatile memory, such as PCM, FLASH, RAM, and so forth. Each core may include any combination of different types of memory without departing from the scope of the present invention. Processor 110 may execute instructions from any suitable memory within system 100. For example, any memory within a processor core, or any of the memory devices within system memory 120, may be considered a computer-readable medium that has instructions stored that when accessed cause processor 110 to perform according to embodiments of the invention.

First core 112 and second core 114 may also make use of Magnetic Random Access Memory (MRAM), which employs magnetic storage elements formed from two ferromagnetic plates located at an intersection of a row and column line and selected by a Magnetic Tunnel Junction (MTJ) device. Current imparted to the row line in one direction causes a magnetic field operative on the MRAM cell biasing the MRAM cell toward a binary state. Due to a magnetic tunnel effect, the electrical resistance of the memory cell changes based on the orientation of the fields in the two plates.

First core 112 and the second core 114 may also make use of Ferro-electric Random Access Memory (FRAM), which employs memory cells that may include one transistor and one capacitor. The capacitor includes ferroelectric material and a bi-stable atom in the ferroelectric material that is shifted to form two stable polarization states. Memory cell data may be written by positively or negatively orienting the dipoles of the ferroelectric material via an applied polarizing voltage. Data may be read by detecting the voltage of the bit line (BL) connected with the memory cell. Current feed circuits supply electric currents to the bit lines for a predetermined period from a start of a read operation, and read control circuitry senses the direction of the electric polarization as either a high or a low logic state. Each orientation is stable and remains in place even after the electric field is removed, preserving the data within the memory without periodic refresh.

Processor 110 is shown coupled to interface 105. Interface 105 provides communication between processor 110 and the various other devices coupled to interface 105. For example, processor 110 may communicate with memory devices in system memory 120, solid state disk (SSD) 140, as well as disk 170. Interface 105 can include serial and/or parallel buses to share information along with control signal lines to be used to provide handshaking between processor 110 and the various other devices coupled to interface 105.

In some embodiments of the invention, system 100 may not include disk 170. For example, in some mobile phone embodiments, disk 170 may not be present. However, in other embodiments of the invention, such as computer-based applications, disk 170 may be included.

System memory 120 includes FLASH memory 122 and PCM 124 operating under the control of controller 130. FLASH memory 122 stores information by storing charge on a floating gate in a Metal Oxide Semiconductor (MOS) transistor. The stored charge alters the threshold voltage of the transistor, and the difference in threshold voltage is "read" to determine whether the stored information is a "0" or a "1". In some embodiments, varying amounts of charge are stored on the floating gate to represent more than one bit of information per memory cell. This is sometimes referred to as Multi-Level Cell (MLC) FLASH. FLASH memory 122 may be any type of FLASH memory, including NOR FLASH memory, NAND single level cell (SLC) memory, or NAND multi-level cell (MLC) memory.

As previously mentioned, system memory 120 also includes PCM 124. A PCM is a memory that stores information based on modifiable material properties, such as whether a material is in a crystalline or an amorphous state (phase). For example, in some embodiments, phase change memories include alloys of elements of group VI of the periodic table, such as Te or Se, that are referred to as chalcogenides or chalcogenic materials. Chalcogenides may be used advantageously in phase change memory cells to provide data retention and remain stable even after the power is removed from the nonvolatile memory. Taking the phase change material as $Ge_2Sb_2Te_5$ for example, two phases or more are exhibited having distinct electrical characteristics useful for memory storage. Phase change memory may be referred to as a Phase Change Memory (PCM), Phase-Change Random Access Memory (PRAM or PCRAM), Ovonic Unified Memory (OUM), Chalcogenide Random Access Memory (C-RAM), or by other suitable names.

Memory devices within system memory 120 may be packaged in any manner. For example, in some embodiments, FLASH memory 122 and PCM 124 may be combined in a stacking process to reduce the footprint on a board, packaged separately, or placed in a multi-chip package with the memory component placed on top of the processor.

Solid state disk (SSD) 140 includes FLASH memory 142, PCM 144, and controller 150. Controller 150 may be any type of controller, including a microcontroller, a microprocessor, or the like. SSD 140 emulates the operation of a hard disk. For example, in some embodiments, SSD 140 may appear to the rest of the system as a FAT (file allocation table) formatted hard drive.

In operation, SSD 140 receives read and/or write requests. The read requests are satisfied by reading contents from FLASH memory 142 and from PCM 144, and the write requests are satisfied by writing to FLASH memory 142 and to PCM 144. Although not shown in FIG. 1, a translation layer may be used within SSD 140 to map logical addresses in the read and write requests to physical addresses in FLASH memory 142 and PCM 144. In some embodiments, the logical addresses include sector numbers and the physical addresses include blocks within the FLASH memory.

In embodiments of the invention, one or more of memory devices 122, 124, 142, and 144 includes hardware-based logic that interprets a set of commands. These commands might include, for example, read and write commands, commands to erase one or more locations within PCM 124, PCM 144, FLASH memory 122, and FLASH memory 142, and so forth. As explained in more detail, especially in the section entitled "Extended Interface Levels, Suspendability, and Nesting", these commands may be "suspendable", meaning that a requested action (such as an "erase" command) runs in the background and can be temporarily stopped and resumed at a later time. Other commands, such as a command to read data from a memory location may not be suspendable, meaning that the requested action must be accomplished according to particular time constraints.

In addition to hardware-based logic, which allows one or more of memory devices 122, 124, 142, and 144 to respond to hardware-decodable commands, in some embodiments of the invention, the one or more memory devices may recognize that an extended interface command has been received during a first write cycle followed by a sub-op-code received during a second write cycle. In response to receiving the sub-op-code, the memory device (or a microcontroller within the memory device) accesses a set of instructions in firmware within the memory device that direct the memory device to perform functions beyond those that can be performed using hardware-based logic. As is discussed in greater detail below with reference to FIG. 3, a switching device (such as a fusible link) can be activated, perhaps during a firmware upgrade, to allow the controller to access previously unused locations within firmware. The switching devices may also be used to enable additional registers and firmware branch instructions to support the extended interface command functionality.

Figure 2:
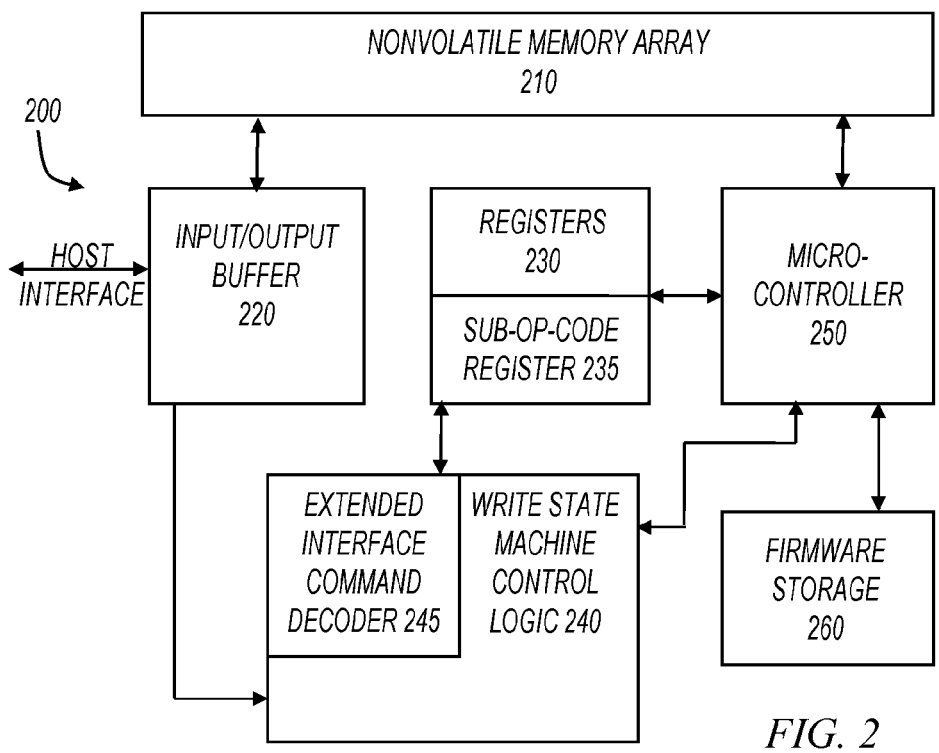
FIGS. 2-3 show memory devices capable of using extended interface commands in accordance with various embodiments of the invention.

FIG. 2 shows memory device 200 capable of using extended interface commands in accordance with various embodiments of the invention. Memory device 200 may be any memory device shown in FIG. 1, including without limitation any of PCM 124, PCM 144, FLASH memory 122, and FLASH memory 142. In FIG. 2, input/output buffer 220 provides an interface with a host processor by way of serial or parallel address and data buses. The host processor may be, by way of example, processor 110, memory controller 130, or memory controller 150 (FIG. 1). In embodiments represented by FIG. 2, input/output buffer 220 provides read and write access to memory locations within nonvolatile memory array 210. Nonvolatile memory array 210 may be of any size, such as 1 MB or smaller, or may be several gigabytes or larger in size.

When input/output buffer 220 receives a hardware-decodable command, such as a command to write one or more data words to nonvolatile memory array 210, write state machine control logic module 240 notifies microcontroller 250 that a write command has been received. The write parameters (such as a memory address and data) are then loaded into one or more of registers 230. Microcontroller 250 then responds to the write command by writing the data at the target memory address.

When input/output buffer 220 receives an extended interface command, the event is recognized by extended interface command decoder 245. In the embodiment of FIG. 2, a sub-op-code that follows the extended interface command indicates the particular operation that is to be interpreted by microcontroller 250. The received sub-op-code is placed in register 235 along with the parameters associated with the sub-op-code. In one embodiment of the invention, a first and a second sub-op code register 235 are provided and extended interface command decoder 245 determines which of the first and second sub-op-code registers should be loaded with data from the write cycles that follow the extended interface command. In such an embodiment, a first sub-op-code register stack may be used as a program buffer, while a second sub-op-code register stack may be used as a command program buffer.

Microcontroller 250 interfaces with firmware storage module 260. In response to receiving an extended interface command and a sub-op-code, microcontroller 250 reads one or more instructions from storage module 260. Based on the instructions, microcontroller 250 accesses parameters in the appropriate register stack, represented by registers 230, and executes the extended interface command.

Figure 3:
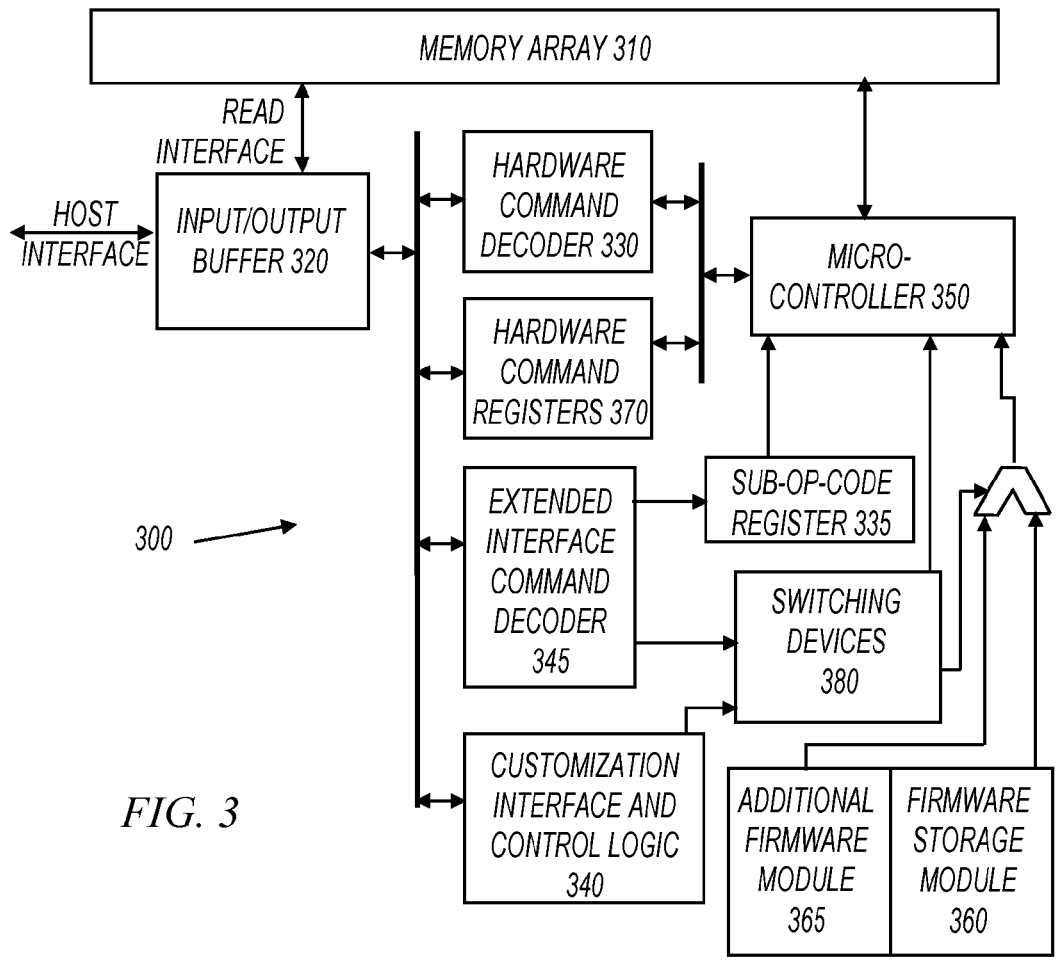

FIG. 3 shows a memory device (300) capable of using extended interface commands in accordance with various embodiments of the invention. Memory device 300 may be any memory device shown in FIG. 1, including without limitation any of PCM 124, PCM 144, FLASH memory 122, and FLASH memory 142. In FIG. 3, input/output buffer 320 provides an interface with a host processor by way of serial or parallel address and data buses. The host processor may be, by way of example, processor 110, memory controller 130, or memory controller 150 (FIG. 1). In the embodiment of FIG. 3, input/output buffer 320 interfaces with hardware command decoder 330, hardware command registers 370, extended interface command decoder 345, and customization interface and control logic 340.

When a hardware-decodable command is received, the command is decoded by way of hardware command decoder 330. For example, in the event that the received command is a command to erase a portion of memory array 310, the "erase" command may be accompanied by a block identification number, a start address, and an end address. The block and address information may be stored within hardware command registers 370 for reading by microcontroller 350.

When an extended interface command is received by input/output buffer 320, extended interface command decoder 345 recognizes the event. In embodiments of the invention, the extended interface command is followed by a sub-op-code that is loaded into sub-op-code register 335 for access by microcontroller 350. Embodiments of the invention may include two or more register stacks within hardware command registers 370 and perhaps the capacity for two or more sub-op-codes to be loaded in sub-op-code register 335. In such embodiments, extended interface command decoder 345 determines which parameter stack should be loaded with parameters and other data that pertain to the sub-op-code. It is contemplated that hardware command decoder 330 may remain passive during the write cycles that follow the receipt of the extended interface command and the sub-op-code.

In some embodiments of the invention, microcontroller 350 is capable of accessing at least some locations within firmware storage module 360 in response to interpreting the contents of sub-op-code register 335. However, switching devices 380 can be used to control access to additional firmware module 365 under the control of customization interface and control logic module 340.

The embodiments of FIGS. 2 and 3 enable the design and manufacture of a system using mask plates that bring about a first set of functions using, for example, hardware command decoder 330 (as in FIG. 3). Upon receipt of hardware-decodable commands, hardware command registers 370 can be loaded with the appropriate parameters and the function executed by microcontroller 350. A second set of functions can be brought about using extended interface command decoder 345, which recognizes the receipt of the command and loads a sub-op-code that follows the command into sub-op-code register 335. In many embodiments of the invention, the use of extended interface commands enables the second set of functions even after the artwork for the mask plates has been sent to the integrated circuit fabrication facility.

After reading the contents of sub-op-code register 335, microcontroller 350 may access firmware storage module 360 which provides instructions to the controller that enable the execution of the particular operation. Additional functionality can be achieved through the use of customization interface and control logic 340, which controls the open/closed state of one or more of switching devices 380. In some embodiments, one of switching devices 380 enables microcontroller 350 to access memory locations within an additional firmware module 365. The switching devices may also be used to enable additional registers and firmware branch instructions to support the extended interface command functionality. In some embodiments of the invention, a current source may be under the control of customization interface and control logic module 340. In these embodiments, the current source may blow, or "program", fusible links. The fusible links may function as branch conditions that cause program branches into additional firmware module 365, which may include firmware instructions corresponding to features not implemented in an initial set of extended interface commands.

In embodiments that make use of PCM devices, it may be desirable to use fusible links to implement control logic instead of PCM cells, given that PCM cells do not retain data at high temperatures. In embodiments that make us of FLASH memory cells, it may be desirable to implement control logic using FLASH memory rather than fusible links.

Figure 4:
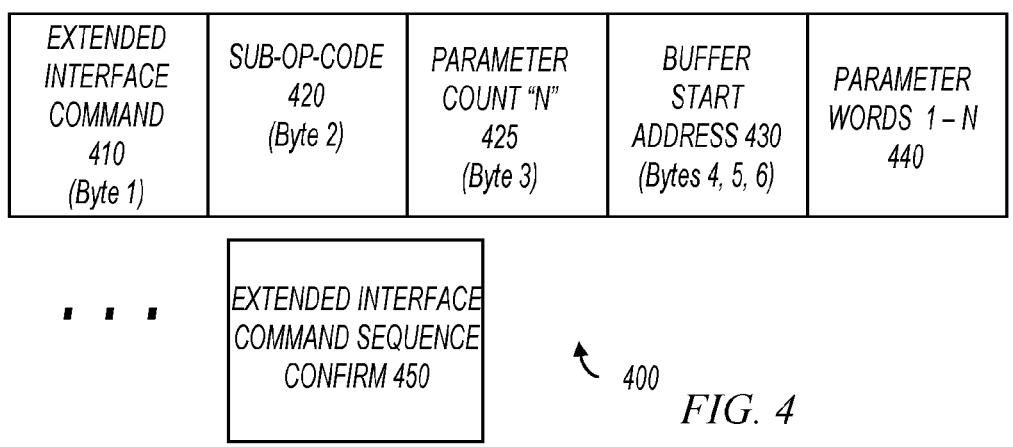
FIG. 4 shows an extended interface command sequence in accordance with various embodiments of the invention.

FIG. 4 shows an example extended interface command sequence (400) in accordance with various embodiments of the invention. In FIG. 4, extended interface command 410 is received during a first write cycle by way of a serial peripheral interface, a parallel interface, or any other suitable interface. In at least one embodiment of the invention, the value of extended interface command 410 is dependent upon the interface as well as the suspendability of the command. In one embodiment, the "CFh" command is used with a serial interface and represents a suspendable command. In another embodiment, which makes use of a parallel interface, the suspendable command "EBh" may be used, or the unsuspendable command "EOh" may be used.

In FIG. 4, sub-op-code 420 is received during a second write cycle (byte 2) followed by a parameter count "N" (425) received at byte 3. Bytes 4, 5, and 6 provide the buffer start address (430) at which the function parameters of sub-op-code 420 are to be loaded. During the subsequent write cycles, parameter words 1-N (440) are loaded into the buffer. In this embodiment, the number of parameter words (440) corresponds to the parameter count "N" (425) provided in byte 3. When the set of function parameters has been received and written to the appropriate buffer, such as input/output buffer 320 of FIG. 3, extended interface command sequence "confirm" signal 450 indicates the end of the extended interface command sequence. In one embodiment of the invention, signal 450 is asserted by driving the signal "S#" high, which instructs the microcontroller to begin execution of the appropriate firmware instructions from firmware storage module 360.

In another embodiment of the invention, the extended interface command sequence of FIG. 4 may not include parameter count "N" (425). In such an embodiment, the parameter count is dependent upon, or dictated by, sub-op-code 420. However, the use of the sub-op-code to determine the parameter count may not allow the sub-op-code to be fully decoded by the microcontroller (such as microcontrollers 250 and 350 of FIGS. 2 and 3, respectively).

As mentioned previously herein, some embodiments of the invention may make use of two or more register stacks. In such an embodiment, one extended interface command sequence may be used for each register stack followed by one extended interface command that functions without parameters. Thus, exemplary command sequences may resemble the following:

$$\text{Extended Interface Command A-->Sub-Op-Code-->} \\ \text{Parameter Count-->Load Parameter Stack A-->} \\ \text{Confirm Command} \quad (1)$$

$$\text{Extended Interface Command B-->Sub-Op-Code-->} \\ \text{Parameter Count-->Load Parameter Stack B-->} \\ \text{Confirm Command} \quad (2)$$

$$\text{Extended Interface Command C-->Sub-Op-Code-->} \\ \text{Confirm Command} \quad (3)$$

Thus, in accordance with (1), (2), (3), an embodiment of the invention that uses 8-bit sub-op-code registers would permit $2^8$ (or 256) additional command features for each extended interface command. Consequently, given an 8-bit wide sub-op-code register, extended interface command decoders 245 and 345 (of FIGS. 2 and 3, respectively) could support up to 768 (256×3) command features. Further, given that the extended interface command features can be implemented using microcontroller-interpreted sub-op-codes, these 768 command features can be implemented without modifications to mask plates generated prior to fabrication of equipment in an integrated circuit fabrication facility.

Figure 5:
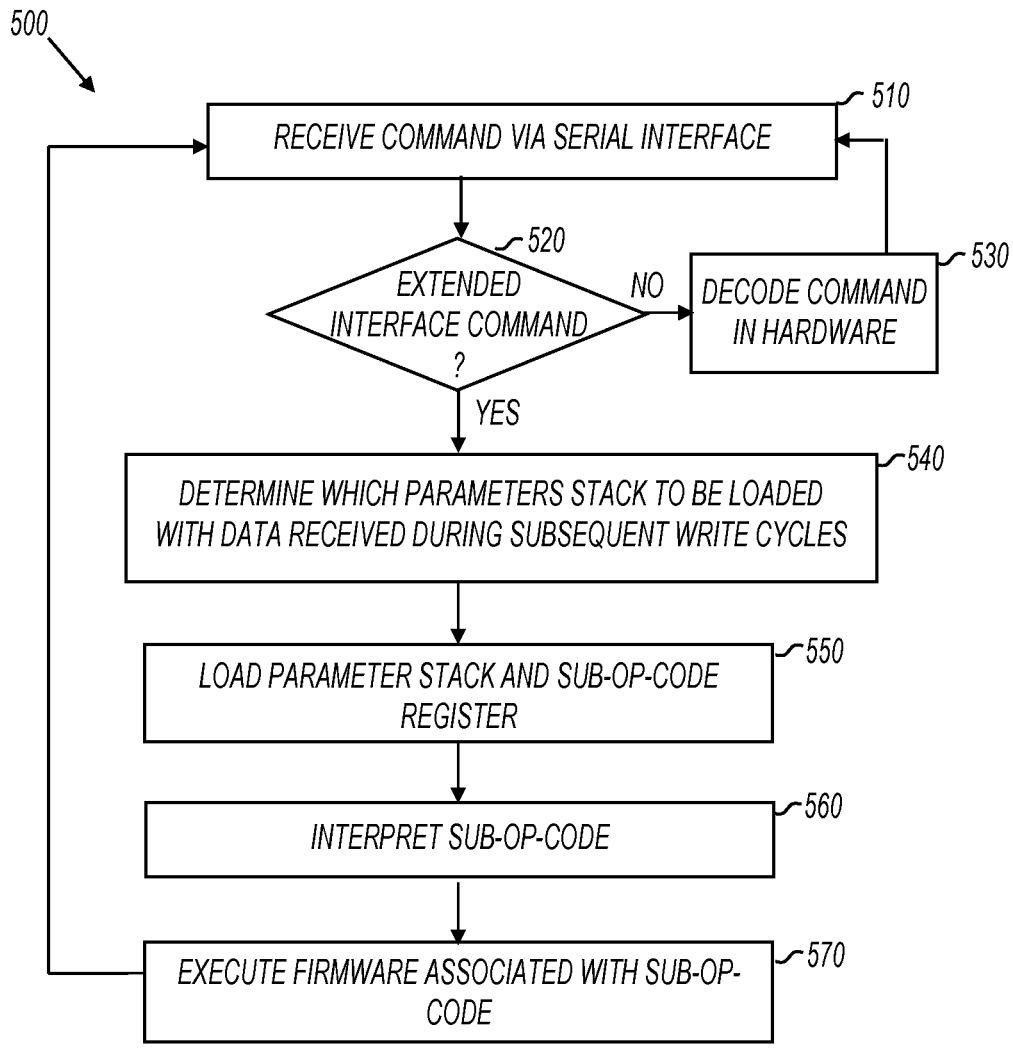
FIGS. 5-6 show flow diagrams for methods of using extended interface commands in memory devices according to various embodiments of the invention.

FIG. 5 shows a flow diagram for a method (500) of using extended interface commands in memory devices according to various embodiments of the invention. The method of FIG. 5 may be performed by the system of FIG. 1, 2, or 3, although nothing prevents other combinations of hardware and software from performing the method. The method begins at 510 in which a command is received by way of a serial interface. At 520, a decision is made as to whether the received command corresponds to an extended interface command or a hardware-decodable command. In the event that the received command corresponds to a hardware-decodable command, 530 is performed in which the command is decoded in hardware. The hardware-decodable command may then be used to perform an operation on a memory array, such as a read operation or a write operation.

In the event that the received command corresponds to an extended interface command, 540 is performed in which a determination is made as to which parameter stack (such as parameter stack A or B from the description of FIG. 4) is to be loaded with data received during subsequent write cycles. At 550, the parameter stack is loaded with the parameters associated with the particular sub-op-code. At 560, a microcontroller interprets the sub-op-code and, at 570, executes the firmware associated with the sub-op-code using the parameters loaded at 550. As a result of the firmware execution, the microcontroller performs an operation within the memory device. The operation may or may not access the memory array. For example, an extended command may access or modify configuration registers within the memory device. Also for example, the extended command may perform read, write, erase, or any combination of operations within the memory array.

In some embodiments represented by FIG. 5, the hardware command decoder referenced in 530 remains passive while 540-570 are being performed.

Figure 6:
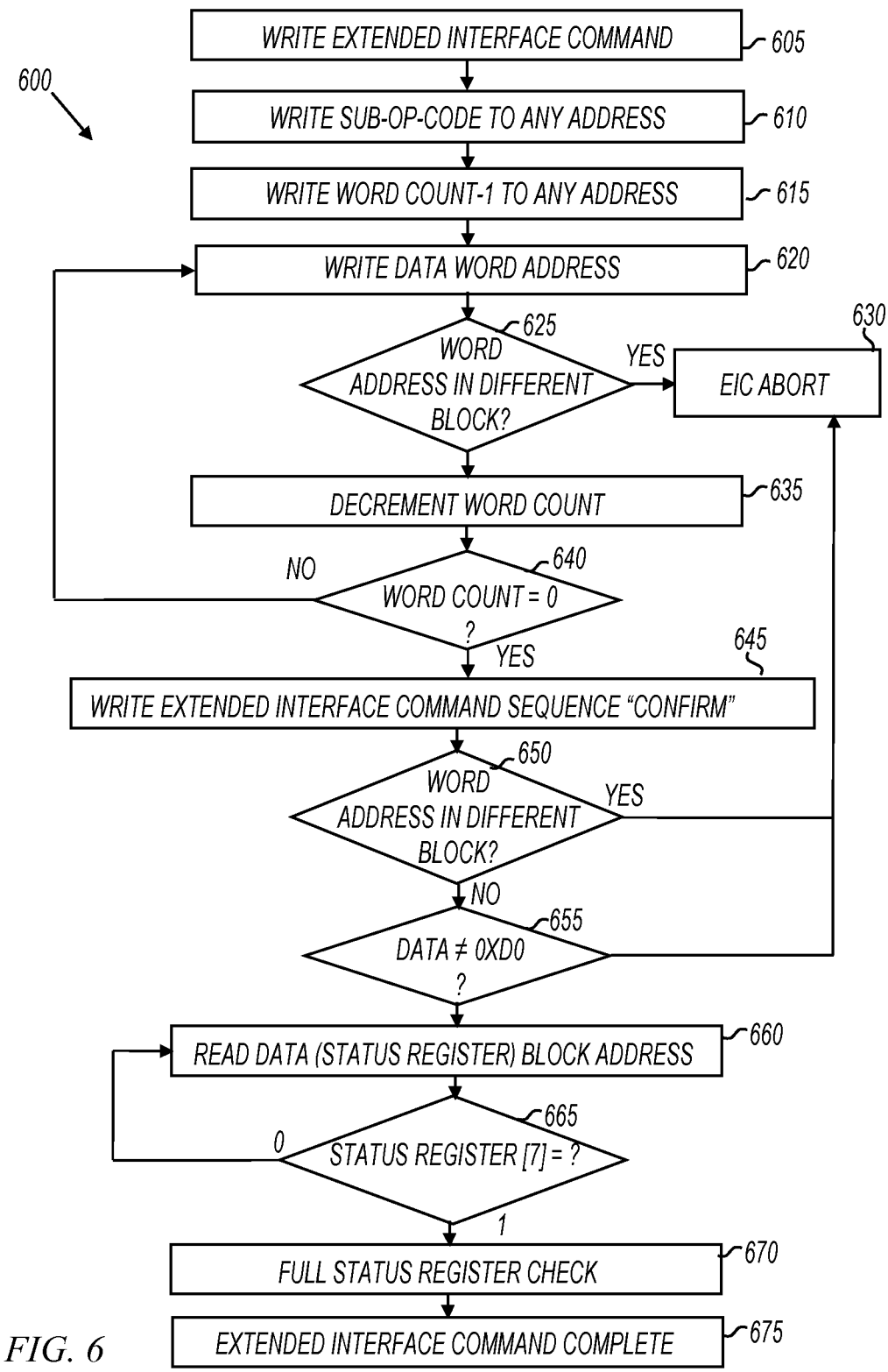

FIG. 6 shows a flow diagram for a method (600) of using extended interface commands in memory devices according to various embodiments of the invention. In some embodiments, method 600 is performed by a host processor that communicates with the memory device. For example, method 600 may be performed by any of processor 110, memory controller 130, or memory controller 150 (FIG. 1). At 605, an extended interface command is written to the memory device. In one embodiment of the invention, this includes writing an extended interface command identifier (for example 0xEB) to a base address of a 1024-byte aligned segment of memory. For many embodiments of the invention, it is contemplated that further data words of the extended interface command sequence are written sequentially starting with the base address.

At 610, the identifier for the sub-op-code is written. In the embodiment of FIG. 6, the sub-op-code can be written to any address of the 1024-byte aligned memory segment. At 615, a value corresponding to the number of words (word count) to be written as part of the extended interface command sequence is written. At 620, the first word of the word count is written to any addresses of the memory segment. At 625, a determination is made as to whether the address for the first word written at 620 resides in a different block than the address used at 605. In the event that the decision of 625 indicates that the data blocks are different, 630 is performed in which the extended interface command (EIC) sequence is aborted.

In the event that the decision of 625 indicates that the data block of the first word written at 620 is the same data block to which the base address was written at 605, the method proceeds to 635 in which the word count is decremented. In the event that the number of words determined in 640 does not equal "0", indicating that there are additional data words to be written as part of the extended interface command sequence, the method returns to 620 in which the next data word of the sequence is written. In one embodiment of the invention, the sequence may include up to 512 words.

At 645, an extended interface command sequence "confirm" code is written. At 650, in the event that the "confirm" code is written to an address within a different data block than the data block of the address written at 605, 630 is performed in which the extended interface command (EIC) sequence is aborted. In the event that the "confirm" code is written to an address within the same data block as the address written to at 605, 655 is performed in which the value of the "confirm" code is checked. In the event that the "confirm" code is not equal to the proper value (such as 0xD0), 630 is performed in which the extended interface command sequence is aborted.

At this point in method 600, an extended interface command sequence has been written to the memory device. For example, the sequence 400 (FIG. 4) may be written to a memory device using the previously described portion of method 600. Once the extended interface command has been written, the memory device will interpret the command and execute firmware as described herein. The remainder of method 600 determines whether the memory device has completed execution of the extended interface command.

In the event that the "confirm" code checked at 655 is correct, the value of a status register bit (e.g., status register bit 7 (SR[7])) is checked at 660. If the decision of 665 indicates that the value of the status register bit equals 0, the value for the status register of additional data blocks may be read. If the decision of 665 indicates that the value of status register bit equals 1, a full status register check may be performed at 670. The extended interface command sequence is then completed at 675.

Figure 7:
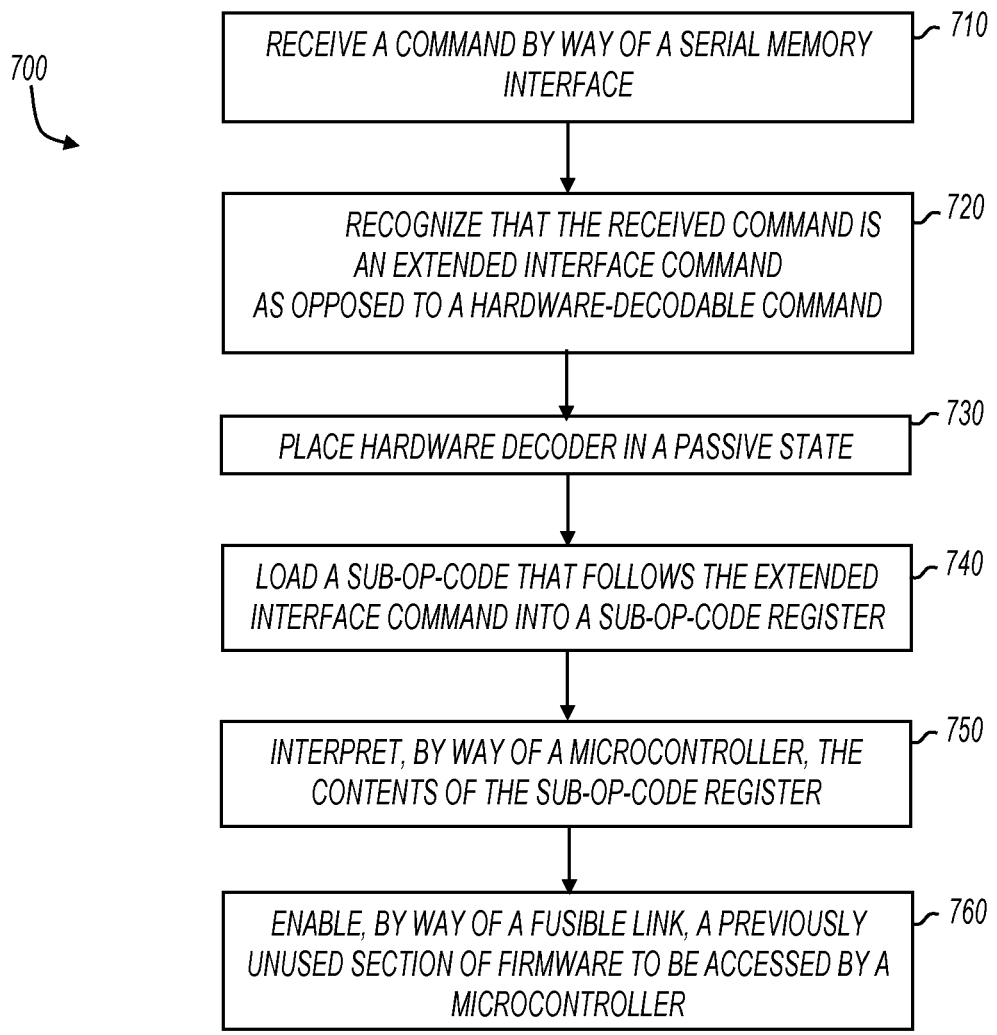
FIG. 7 shows a simplified flow diagram for a method of using extended interface commands in memory devices according to various embodiments of the invention.

FIG. 7 shows a simplified flow diagram for a method of using extended interface commands in memory devices according to various embodiments of the invention. The method of FIG. 7 begins at 710 in which a command is received by way of a serial memory interface. At 720, the received command is recognized as being an extended interface command as opposed to a hardware-decodable command.

At 730, a hardware decoder is placed in a passive state. At 740, a sub-op-code that follows the extended interface command is loaded into a sub-op-code register. At 750, the contents of the sub-op-code register is interpreted by way of a microcontroller. At 760, a fusible link is used to enable a microcontroller to access a previously unused section of firmware. The previously unused section of firmware enables the extended interface command to be executed.

In some embodiments of the invention, only a subset of the actions of FIG. 7 may need to be performed. Thus, one embodiment of the invention may include receiving a command by way of a serial memory interface (710), recognizing that the received command is an extended interface command as opposed to a hardware-decodable command (720), loading a sub-op-code that follows the extended interface command into a sub-op-code register (740), and interpreting, by way of a microcontroller, the contents of the sub-op-code register (750).

Extended Interface Levels, Suspendability, and Nesting:

In embodiments of the invention, extended interface commands can be categorized depending on the ability to suspend a particular command, the ability to nest a command, and the resources required to execute the command. An exemplary level-1 extended interface command may be similar to an "erase" command that runs as a background process and can involve a high level of nesting. Level-1 extended interface commands are contemplated as being suspendable and resumable. In this example, when a level-1 command is suspended, status register bit 6 may be set to 1 (SR[6]=1), and the program buffer contents are not required to be retained during the level-1 suspend state.

In embodiments of the invention, all level-1 commands are disallowed when a memory system is placed in a suspend state (with SR[6]=1). When the memory system is in a level-1 suspended state, a "program" command and all level-2 and level-3 commands are allowed. Level-1 extended interface commands can be used with a sub-op-code and associated parameters loaded in a command register stack or in a program register stack (see Table 1 below).

In one example, an operation that sets a large, continuous memory space to values equal to "1", such as a block erase on a NOR FLASH memory device, can be suspended to program data to a different memory region. In many FLASH-based systems, the erase operation can be time-consuming and is thus performed as a background operation. In contrast, an operation to program a memory region may be much less time-consuming. In this embodiment, the erase command is an example of a level-1 extended interface command, the program command is an example of a level-2 extended interface command, and a configuration-read is an example of a level-3 command.

Regarding level-2 extended function interface commands, a command to program a region of memory may be an example of a level-2 command that runs in the foreground and involves a higher level of nesting than level-1 commands.

Level-2 commands may be suspendable and resumable (as with level-1 commands). When level-2 extended interface commands are suspended, a particular bit of a status register (such as status register bit 2) maybe be set equal to 1. In this example, when the memory system is in a level-2 suspend-state (with SR[2]=1), level-3 extended interface commands may be the only commands allowed, which implies that erase, program, level-1 and level-2 extended interface commands are not allowed.

The contents of the program buffer may be retained during the level-2 suspended state. Level-2 extended interface commands may not be allowed during an erase, but may be allowed during an erase-suspend and during a level-1 suspended-state (with SR[6]=1). Level-2 extended interface commands can be used with a sub-op-code and associated parameters loaded in a command register stack or in a program register stack. (See Table 1 hereinbelow.)

As it pertains to level-3 commands, these commands have a lower level of nesting than level-1 and level-2 commands. In embodiments of the invention, level-3 commands are executed within write-suspend latency time and are not suspendable. It is contemplated that level-3 commands are used with a sub-op-code and associated parameters loaded in a command register stack, and are not used with a program register stack. In this example, level-3 extended interface commands are used when the memory system has been placed in a level-one suspended-state (with SR[6]=1) and/or when the memory system has been placed in a level-2 suspended-state (with SR[2]=1).

Table 1 summarizes the nesting rules for executing the extended interface command erase and program commands with the memory system in an erase or level-1 suspended state a level-2 suspend state. In Table 1, an "Abort" results in a command sequence error. When the customer unit interface (CUI) supports a command, the interface sets status register 4 and status register 5 equal to 1 (SR[4]=1, SR[5]=1). When firmware aborts a command, the firmware sets (SR[4]=1, SR[5]=1). In Table 1, it should also be noted that when the memory system has been placed in a level-2 suspended state, the command user interface aborts all extended interface command program buffer commands. As previously mentioned, in this embodiment, all level 1 commands are disallowed during a level-1 suspend.

For level-1 extended interface commands, the CUI does not interpret the sub-op-code and thus does not recognize the presence of a level-1 command. In these instances, the CUI passes the command along to the microcontroller (i.e. "CUI: Execute") where the command is subsequently aborted as instructed by firmware. This detail can be significant in some implementations since if the CUI were to allow the level-1 command to load, the command could potentially overwrite the command/program buffer contents and cause the suspended level-1 command to be corrupted.

In contrast with the above example, an "erase" command may be recognized by the CUI so that the CUI can ignore the command during a level-1 suspend. In this instance, the command/program buffer contents will not be corrupted by the ignored command. In one embodiment, the CUI interprets op-codes (extended interface commands) but not sub-op-codes.

In conclusion, although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A memory device comprising:
    a memory array;
    a serial interface buffer configured to receive a hardware-decodable command and an extended interface command;
    a logic module coupled to the serial interface buffer and configured to direct the hardware-decodable command to a register for execution by a microcontroller, the logic module further configured to load a command received following the extended interface command into a. sub-op-code register, wherein the logic module remains passive after loading the command received following, the extended interface command into the sub-op-code register; and
    a microcontroller configured to interpret the command in the sub-op-code register to perform operations on the memory array.

2. The memory device of claim 1, further comprising a customization module configured to make available, by way

TABLE 1

Summary of Extended Interface Command Nesting Rules

| Current Suspend State | Next Command | | | | | | |
|---|---|---|---|---|---|---|---|
| | Erase | Level-1 Extended Interface Command (Program Buffer) | Level-1 Extended Interface Command (Command Program Buffer) | Program | Level-2 Extended Interface Command (Program Buffer) | Level-2 Extended Interface Command (Command Program Buffer) | Level-3 Extended Interface Command (Command Program Buffer) |
| Erase or Level-1 Suspended State (SR[6] = 1) | CUI: Ignore | CUI: Execute Firm-ware: Abort | CUI: Execute Firm-ware: Abort | CUI: Execute Firm-ware: Execute | CUI: Execute Firm-ware: Execute | CUI: Execute Firm-ware: Execute | CUI: Execute Firm-ware: Execute |
| Program or Level-2 Suspended State (SR[2] = 1) | CUI: Ignore | CUI: Abort | CUI: Execute Firm-ware: Abort | CUI: Ignore | CUI: Abort | CUI: Execute Firm-ware: Abort | CUI: Execute Firm-ware: Execute | of a branch condition, at least one previously-unused, segment of firmware for execution by the microcontroller.

3. The memory device of claim 2, wherein the branch condition is implemented by way of a fusible link and wherein the firmware is implemented using phase change memory.

4. The memory device of claim 2, wherein the branch condition is implemented by way of instructions stored in a FLASH memory and wherein the firmware is implemented using FLASH memory.

5. The memory device of claim 1, wherein the extended interface command and the command following the extended interface command are received during consecutive write cycles.

6. The memory device of claim 1, wherein the microcontroller is further configured to interface with at least one of the group consisting of NAND FLASH and phase change memory.

7. The memory device of claim 1, further comprising a first register stack configured to load the first extended interface command along with at least one parameter associated with the first extended interface command and a second register stack configured to load a second extended interface command and at least one parameter associated with the second extended interface command.

8. The memory device of claim 1, wherein the microcontroller is further configured to interpret the command in the sub-op-code register to determine firmware instructions to be executed.

9. A method comprising:
receiving, a command by way of a serial memory interface;
recognizing the received command is an extended interface command as opposed to a hardware-decodable command;
loading a sub-op-code that follows the extended interface command into a sub-op-code register;
interpreting, by way of a microcontroller, the contents of the sub-op-code register including maintaining a hardware decoder in a passive state in response to receiving the extended interface command and the sub-op-code; and
performing an operation in a memory array in response to the sub-op-code.

10. The method of claim 9, wherein the interpreting includes accessing a firmware memory to obtain at least one instruction that pertains to the sub-op-code.

11. The method of claim 9, wherein the extended interface command is received during a first write cycle and wherein the sub-op-code is received during a second write cycle that immediately follows the first write cycle.

12. The method of claim 9, further comprising: enabling previously-unused firmware to be executed by the microcontroller.

13. The method of claim 12, wherein the enabling is performed during a firmware upgrade.

14. The method of claim 13, wherein the enabling includes activating a fusible link.

15. An apparatus comprising:
a logic module configured to receive a hardware-decodable command and an extended interface command by way a serial interface buffer, wherein the logic module is further configured to direct the hardware-decodable command to a register fur execution by a microcontroller, and wherein the logic module is further configured to load a command following the extended interface command into a sub-op-code register; and
at least one fusible link configured to enable a microcontroller to access instructions for interpreting the command following the extended interface command responsive to being activated.

16. The apparatus of claim 15, wherein the at least one fusible link is configured to enable access to a register coupled to the microcontroller.

17. The apparatus of claim 15, wherein instructions that decode the hardware-decodable commands are stored in a first memory module;
wherein instructions for interpreting the command following the extended interface command are stored in a second memory module; and
wherein the at least one fusible link is configured to function as a branch condition that causes a program branch that allows the microcontroller to access memory locations of the second memory module.

18. The apparatus of claim 15, wherein the microcontroller is configured to interface with at least one of the group consisting of NAND FLASH and phase change memory.

19. The apparatus of claim 15, further comprising selection logic configured to determine if additional fusible links, other than the at least one fusible link, should be activated in response to receiving an additional extended interface command and a sub-op-code that follows the additional extended interface command.

* * * * *

UNITED STATES PATENT AND TRADEMARK OFFICE
CERTIFICATE OF CORRECTION

PATENT NO. : 8,843,731 B2  
APPLICATION NO. : 12/982847  
DATED : September 23, 2014  
INVENTOR(S) : Christopher Bueb et al.

Page 1 of 1

It is certified that error appears in the above-identified patent and that said Letters Patent is hereby corrected as shown below:

In the Claims

In column 12, line 36, in Claim 1, delete "a." and insert -- a --, therefor.

In column 13, line 1, in Claim 2, delete "previously-unused," and insert -- previously-unused --, therefor.

In column 14, line 16, in Claim 15, delete "fur" and insert -- for --, therefor.

Signed and Sealed this
Twenty-third Day of December, 2014

Michelle K. Lee
*Deputy Director of the United States Patent and Trademark Office*